(12) United States Patent
Haster

(10) Patent No.: US 6,278,700 B1
(45) Date of Patent: Aug. 21, 2001

(54) ARRANGEMENT AND METHOD RELATING TO TELECOMMUNICATIONS NETWORKS

(75) Inventor: Lars-Olof Haster, Huddinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/069,394

(22) Filed: Apr. 29, 1998

Related U.S. Application Data

(63) Continuation of application No. PCT/SE96/01360, filed on Oct. 23, 1996.

(30) Foreign Application Priority Data

Oct. 31, 1995 (SE) .................................................. 9503828

(51) Int. Cl.$^7$ .................................................. H04Q 7/00
(52) U.S. Cl. .................................................. 370/329; 370/359
(58) Field of Search .................................................. 370/310, 312, 370/313, 328, 329, 351, 359, 389

(56) References Cited

U.S. PATENT DOCUMENTS 5,040,177   8/1991   Martin et al. .
5,640,196 * 6/1997   Behrens et al. ........................ 348/14
5,754,555 * 5/1998   Hurme et al. ........................ 370/522

OTHER PUBLICATIONS

Khakzar, Karim, "V5 Interfaces between Digital Local Exchanges and Access Networks", *Frequenz*, pp44–50 (1994).

"ETSI standard, ETS 300 324–1, V5.1 interface specification", pp15–20,32–36,45–48,55–58,117–122, Feb., 1994.

Schmickler, Von Leonhard, "Die Q3–management schnittstelle des Angchlussnetzes für V5–schnittstellen und zugehörige Teilnehmeranschlüsse", vol. 48, No. 1–2, pp50–55 (1994).

* cited by examiner

*Primary Examiner*—David R. Vincent
(74) *Attorney, Agent, or Firm*—Burns, Doane, Swecker & Mathis, L.L.P.

(57) ABSTRACT

An arrangement and a method provide access between a number of user stations connected by radio via a number of radio base stations and a switching arrangement of a telecommunication network. At least one access network is provided, and it connects to the switching arrangement over at least one interface. A radio access network including a number of base stations is provided which also includes the access network. An address field of an addressing mechanism of the interface between the access network and the switching arrangement is so structured that it includes a first part for addressing base stations and a second part for addressing/identifying selected bearer channels on the existing interface.

30 Claims, 5 Drawing Sheets

ARRANGEMENT AND METHOD RELATING TO TELECOMMUNICATIONS NETWORKS

This application is a continuation of International Application No. PCT/SE96/01360, which was filed on Oct. 23, 1996, which designated the United States, and which is expressly incorporated here by reference.

BACKGROUND

The present invention relates to an arrangement for providing access between user equipment (such as for example cordless telephones) which are connected to base stations via radio and a switching arrangement of a telecommunications network wherein at least one access network is provided which interfaces the switching arrangement(s) via at least one interface.

The invention further relates to a telecommunications system comprising a telecommunications network and a number of user stations connected via radio to a number of base stations, said telecommunications network comprising a number of switching arrangements, the system further comprising at least one access network connecting to the switching arrangements over at least one interface.

Still further the invention relates to a method for providing access between a number of user stations connected via radio to a number of base stations and a local exchange of a telecommunications network with a number of switching arrangements wherein access is provided via an access network connecting to the switching arrangements of the telecommunications network.

It is becoming more and more interesting to use radio in telecommunication networks. Services of interest are for example Cordless Terminal Mobility (CTM) and Radio in the Local Loop (RLL). The network architecture of existing public switched communication networks is not such as to enable handling of users connected via radio, for example via the DECT air interface (Digital European Cordless Telephone System) to the local exchanges of the public switched systems, among others since these users are movable within the network. Today there is no standardized interface for interfacing CTM services to the local exchanges. This means that there is no interface handling the mobility of these subscribers in the network for the necessary transmission between local exchanges and the subscriber. The V5.1 interface standardized by ETSI, European Telecommunications Standard Institute, ETS 300 324-1, interconnects an Access Network (AN) with a Local Exchange (LE) of a Public Switched Telecommunications Network and it comprises a 2048 kbit/s data link for multiplexing of up to 30 PSTN or 15 ISDN-BA (Basic Access) accesses. This interface can however not take care of the mobility of the subscribers as referred to above. For traditional users there is a fixed relation between the directory number (DN) and the equipment to the User Network Interface (UNI). For the handling of movable users which can be anywhere in the network, the connection of the user and used base stations (when referring to the DECT system, these are known as Radio Fixed Parts RFP), is not sufficiently flexible and moreover the traffic concentration of the interface can not be handled.

U.S. Pat. No. 5,040,177 describes an access network for a cordless telephone service. This access network comprises a distribution network with base stations connected by cable to the public switched network and digital cordless telephones. Each telephone is connected by radio to the same base station throughout the duration of a call. Moreover the access network comprises a service control point network with network service control points connected to the public switched network. Each point comprises a data base of cordless telephone service subscribers for processing a number of functions in real time. The service control point network moreover comprises a managing service control point controlling the databases. The service control point network has the architecture of an intelligent network. Each base station is connected to the public switched network via a 2B+D or a 30B+D type channel. The public network is an integrated services network. A conversion is effected to and from ISDN protocol.

However, none of the known systems works as satisfactorily or is as simple as desired e.g. relating to fulfilment of requirements for example as to traffic concentration, ability of handling handovers without generating any necessary signalling to the switching arrangement (such as a local exchange) of the public switched communications network etc.

SUMMARY

What is needed is therefore an arrangement for providing interface between a telecommunications network and a number of user stations connected by radio which is capable of handling a large number of users, particularly over merely a few interfaces and wherein the transmission within the network is kept low. Moreover an arrangement is needed through which internal handovers can be handled in an access network (AN) without generating unnecessary signalling within the switching means of the telecommunications network, particularly the local exchanges, and through which the use of data and data storing within the switching means or local exchange(s) can be minimized.

Moreover an arrangement is needed which provides an efficient usage of the radio unique equipment of the radio network.

What is needed is an arrangement which enables integration of the base stations (or in a particular embodiment Radio Fixed Parts (RFP)) in the switching arrangements of the telecommunications network, particularly in the local exchanges. A particular embodiment relates to providing an arrangement through which DECT based services can be integrated into a telecommunications network, e.g. a public switched communications network, particularly the local exchange(s) thereof. Moreover a particular embodiment relates to providing an arrangement through which DECT based services can be integrated into a telecommunications network, particularly the Public Switched Telecommunications Network (PSTN) or the Integrated Services Digital Network (ISDN).

Still further an arrangement is needed through which CTM services can be provided, particularly in such a way that operation and maintenance can be provided in an easy and appropriate way. Eventually might fixed radio, radio in the Local Loop (RLL) services be offered.

What is needed is also a telecommunications system comprising a fixed telecommunications network with a number of switching means such as for example local exchanges and a network with at least a number of user stations connected via radio to a number of base stations wherein said user stations connected via radio can access the fixed telecommunications network.

Furthermore a method is needed for connecting a movable subscriber connected via radio to a telecommunications network or similar.

Thus an arrangement is provided in which an existing interface is so structured that the radio connected user stations can be connected to the telecommunications network.

Particularly the interface is a V5.1 interface of which an address field is so structured that it comprises a first and a second part wherein the first part is used for addressing base stations and the second part is used for addressing or identifying selected bearer channel on the interface.

An Access Network (AN) is implemented between e.g. a local exchange and the user station which is comprised by a Radio Access Network (RAN) comprising radio unique functionalities. A number of user ports are implemented in the RAN and via the address field comprising a first and a second part the correct base station can be directly pointed out in the RAN and via the second part the selected bearer channel or time slot can be selected by the RAN for interconnecting the subscriber with a switching arrangement, for example a local exchange, of the fixed telecommunications network.

Via the first part of the address field each base station of the RAN can be identified. Particularly the switching arrangements of the telecommunications network comprise a number of local exchanges, the channels to the local exchanges being for example 64 kbit/s bearer channels. Each base station handles a number of bearer channels, for example 12. These figures are however only given for exemplifying reasons and are not intended to limit the invention thereto.

In a particular embodiment the invention relates to the DECT system wherein the RAN is denoted a DECT Radio Access Network (DRAN). In this embodiment the base stations are denoted Radio Fixed Parts (RFP). In an advantageous embodiment, irrespective of whether the DECT system is concerned or not, there may be more than one (e.g. V5.1) interface between the AN or the RAN (DRAN) and the switching means, particularly the local exchanges (LE). Interface herein refers to the interface of which an address field (EFaddr for ISDN, L3addr for PSTN) is structured according to the invention.

The user stations particularly comprise cordless stations providing Cordless Terminal Mobility (CTM), i.e. CTM services are provided.

It is particularly advantageous to apply ISDN signalling.

A telecommunications system is also provided which comprises a (fixed) telecommunications network and a number of user stations or subscriber stations connecting to a number of base stations. One or more interface(s) is/are located between the (Radio) Access Network and a number of switching arrangements or particularly local exchanges of the telecommunications network through which at least a number of base stations can be addressed or identified via a RAN comprising an AN (or an extended access network) and through which the RAN can select bearer channel on the interface for connection of the subscriber with the switching arrangement(s).

Further advantageous embodiments are given by the appended subclaims.

It is an advantage of the invention that the V5.1 standard can be used substantially as defined and in that it can be applied substantially without additions, however providing a new application.

BRIEF DESCRIPTION OF THE DRAWINGS

The invention will in the following be further described in a nonlimiting way under reference to the accompanying drawings in which.

DETAILED DESCRIPTION

The invention relates to the provision of an arrangement for connecting or interfacing for example a Radio Access System to a fixed telecommunications network such as for example the Public Switched Telecommunications Network PSTN or the Integrated Services Digital Network ISDN. According to the invention such radio access systems, generally comprising a number of portable parts PP or cordless stations are connected to switching arrangements such as Local Exchanges LE of a fixed telecommunications network. Particularly the invention relates to providing e.g. CTM in a fixed telecommunications network which may be public, private or a combination thereof.

One example on a Radio Access System as referred to above is the DECT system. The DECT network is standardized in the ETSI standard ETS 300 175.

Figure 1:
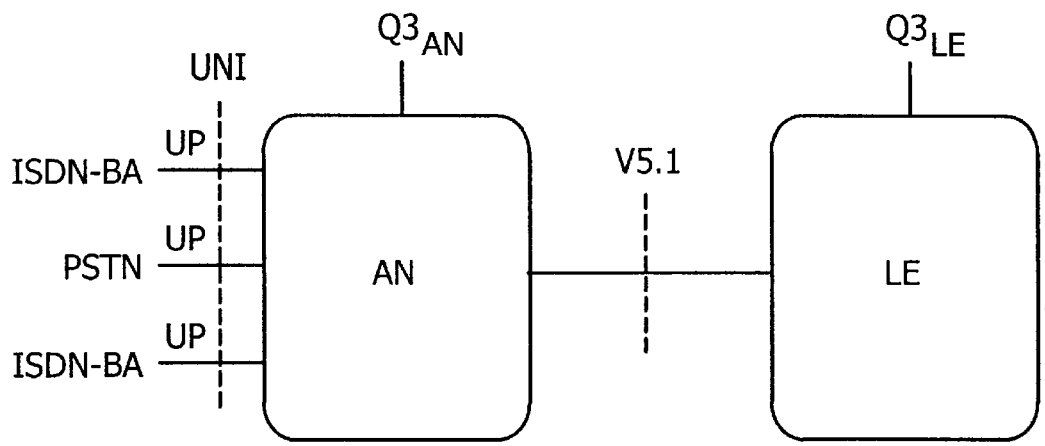
FIG. 1 schematically indicates the V5 architecture as standardized by ETSI (ETS 300324-1) and further also adapted by ITU-T (G.964)

The European Telecommunications Standard Institute (ETSI) has produced a standard of type V, the V5.1 interface (ETS 300 324-1) as an interface between the two systems, Access Network AN and Local Exchange LE with flexible (provisioned) information channel (bearer channel) allocation but without concentration capability within the AN. Supported access types in the V5 interface standard are ISDN-BA and PSTN services. The interface comprises a 64 kbit/s data link for the multiplexing of up to 30 PSTN or 15 ISDN-BA accesses. This is schematically indicated in FIG. 1 wherein the AN and the LE respectively are connected to the likewise standardized Q3 interface, here denoted $Q3_{AN}$ and $Q3_{LE}$ respectively. Via the User Network Interface UNI and a number of User Ports UP the accesses are provided.

However, as already discussed in the foregoing, the interface in its present (standardized) form does not support or cannot handle subscribers or users which are movable within the network. In a first aspect of the invention, a telecommunications network such as the PSTN or the ISDN comprises a number of switching arrangements, particularly Local Exchanges LE. According to this first aspect the invention relates to providing user stations (Portable Parts) with access to CTM services in a LE. This will be more explicitly discussed under reference to the DECT system, i.e. the provision of DECT access to the CTM services.

Figure 2:
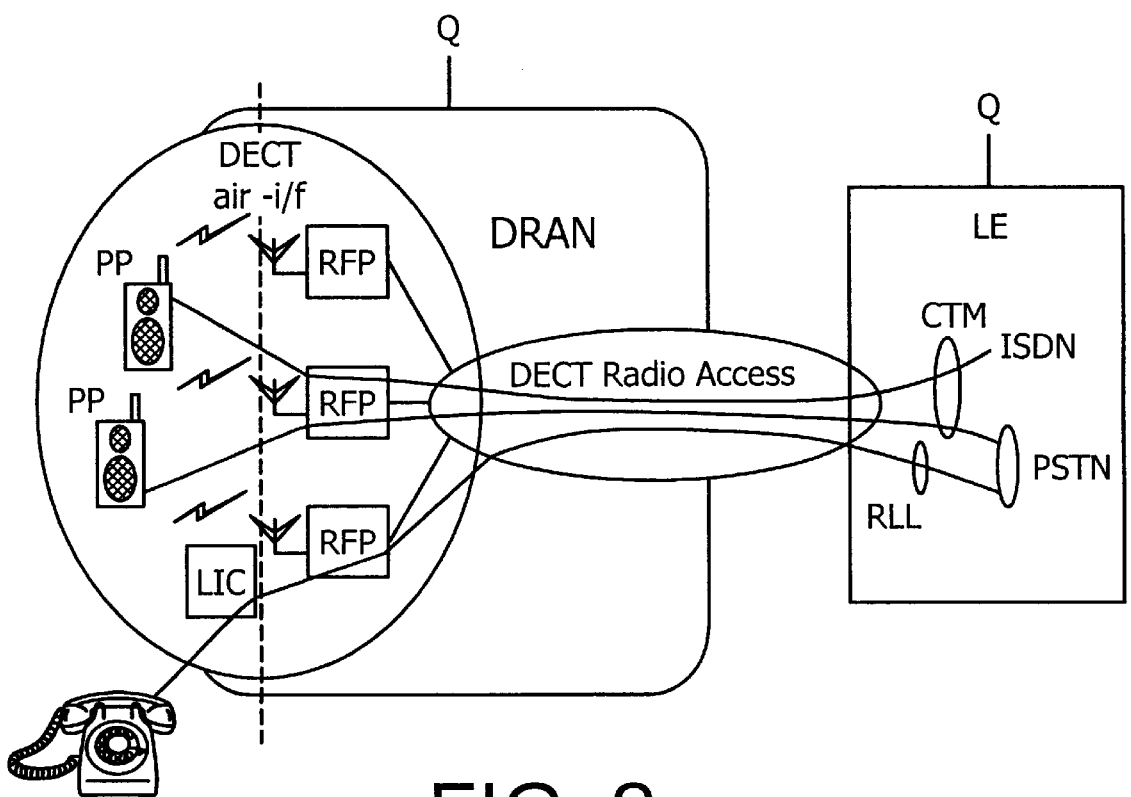
FIG. 2 illustrates one embodiment relating to the DECT Access Interface, FIG. 3 gives an example on a DECT Radio Access Network according to the invention.

FIG. 2 is intended to illustrate a DECT Access Interface. Portable Parts PP are via radio, the DECT air interface, connected to a number of base stations or Radio Fixed Parts RFP. In the figure is also illustrated the principle of radio in the Local Loop RLL wherein a telephone via a Line Interface Circuit LIC via the DECT Air Interface is connected to a RFP. (Although the invention is mainly intended for providing an arrangement for supporting services such as e.g. CTM (cordless telephony or portable parts) it can also be used for providing RLL services according to a particular embodiment). A Radio Access Network RAN, or in this particular case a DECT Radio Access Network DRAN, is arranged and the DECT Radio Access Interface which according to the invention comprises a V5.1 interface is schematically illustrated. The invention here thus deals with linking the DECT Air Interface to a LE. The DECT Access Interface is located between the LE and the RFP, i.e. the base stations. A Radio Fixed Part as defined relates to a physical subgroup of fixed parts that contains all the radio end points (one or more) that are connected to a single system of antennas. A Portable Part PP or a DECT Portable Part means a physical grouping containing all elements between the user and the DECT air interface. A Portable Part is a generic term that may describe one or several pieces. A DECT PP is logically divided into one portable termination plus one or more portable applications. The DECT Radio Access Network DRAN is implemented on the Radio Termination Part (c.f. ETS 300 175:5) of the interface in order to enable an efficient usage of the radio unique equipment. In the following the invention will particularly be further described in relation to the provision of CTM services as referred to above. The V5.1 standard is defined in the multi-part standard ETS 300 324-1. The standard supports two kinds of access applications, namely PSTN, analogue telephone access and ISDN-BA, ISDN basic access which are flexibly provisioned over the V5 interface. For explanatory reasons and in order to provide a better understanding of the invention some definitions as defined in the ETSI V5.1 standards (referred to above) will be given.

Figure 5:
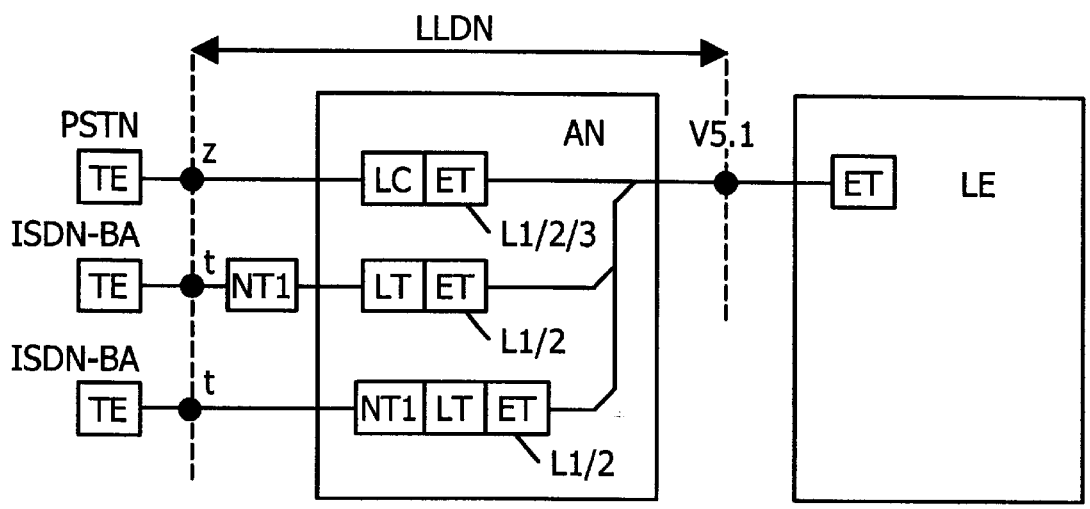

An Access Network AN is a system which is implemented between the Local Exchange LE and the user and which replaces part of, or the whole of, the Local Line Distribution Network LLDN (see FIG. 5). The functions associated with the V5 interface or interfaces of an AN can be configured and operated flexibly via a management Q interface. An AN may e.g. comprise multiplexing, cross-connect and transmission functions. The V5 interface (ETS) is independent of the transmission media used inside the AN. An AN may furthermore support services outside the scope of above-mentioned standard.

A bearer channel means a 64 kbit/s time slot in the V5.1 interface allocated for a B-channel (Speech and Data Transmission channel) of an ISDN user port or a PCM (Pulse Code Modulation) encoded 64 kbit/s channel from a PSTN user port. A user port means a physical port implemented in the AN to provide the relevant interface functions towards the user. The user port is addressed by a logical address used in the relevant protocols on the V5 interface. The V5 interface in turn is a general term for the family of V interfaces for connection of ANs to the LE, e.g. a V5.1 interface or a V5.2 interface.

In the following the addressing mechanisms of the V5.1 interface will be briefly discussed. What is defined is the EFaddr which is an address to identify different V5 enveloping function sublayer connections, each of them used to support a relaying mechanism for LAPD (Link Access Protocol D-channel) frames (ISDN) or messages corresponding to the V5 layer 3 protocols (CTRL in relation to a particular application; otherwise also PSTN). EFaddr= 0–8175 identifies ISDN-BA User Ports UP in the AN, EFaddr=8176 identifies messages for the PSTN signalling, EFaddr=8177 identifies messages for the Control protocol signalling and EFaddr=8178–8191 are reserved for V5.2 and further V5 protocols (not relevant here).

L3addr denotes an address within layer 3 messages (both for PSTN and Control protocols) of EFaddr types to uniquely reference an UP. For ISDN the maximum L3addr is 13 bits.

UP means the physical port in the AN that represents the interface to the user. The UP is addressed by a logical address, (L3addr for PSTN) control layer 3 messages if EFaddr is lower than 8176 used in the V5 interface that corresponds to the subscriber number in the LE.

VDLaddr denotes an address used in LAPV5-DL frames to identify different V5 data link sublayer connections, each of them used to support a particular V5.1 layer 3 protocol. The V5 DLaddr is a direct copy of the EFaddr.

As referred to above PSTN and ISDN-BA accesses can flexibly be provisioned over the V5 interface. Commands are used to build up the relations between the physical UP in the AN with a logical layer 3 address (L3addr) over the V5 interface to the Directory Number (DN).

If ISDN and PSTN are connected to the AN over the V5.1 interface to the LE, the UNI B-channels are fixedly allocated to one 64 kbit/s channel each over the V5.1 interface. The V5.1 interface can therefore only be used to support and address up to 30 physical PSTN UP's or up 15 ISDN-BA UP's. For ISDN the logical number of the UP can be in the range of 0–8175 and for PSTN the logical number of the UP can be 0–32767.

Figure 3:
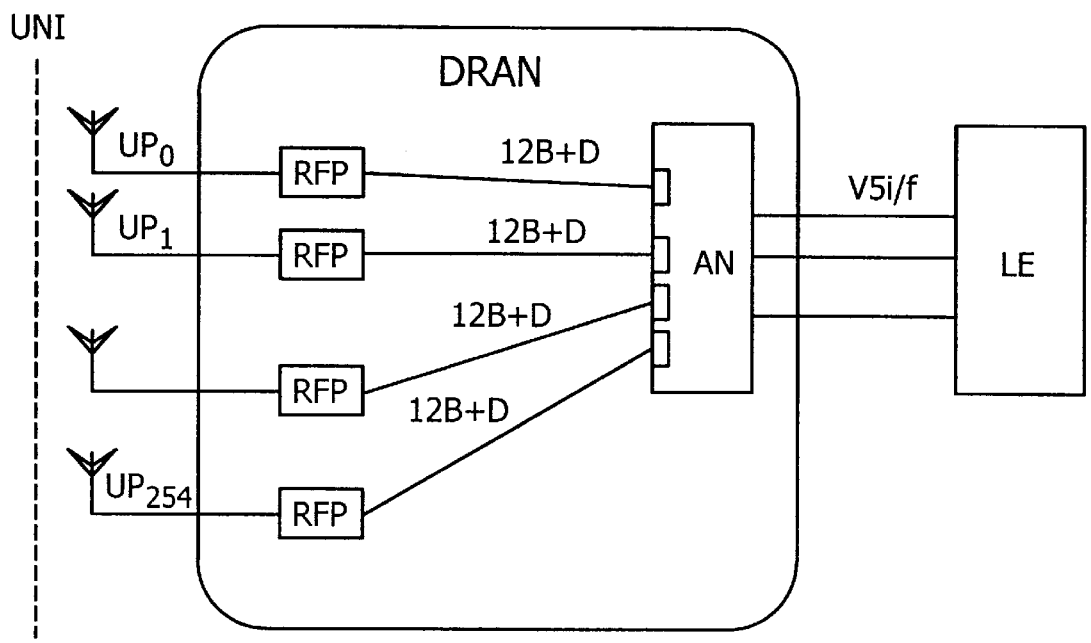

In order to provide radio access as discussed above, an address field of the V5.1 interface is "divided", i.e. structured in such a way that it comprises a first and a second part. Furthermore a Radio Access Network RAN is formed which can be said to form an extended AN which can be seen as a RAN having additional functionality which also comprises an "ordinary" AN as discussed above. In a particular embodiment which will be discussed, the RAN is denoted a DECT Radio Access Network DRAN (see FIG. 3). The DRAN has the functionality of an AN (or comprises an AN) with the addition of radio unique functionalities such as internal handover, intra-cell handover etc. Further examples relate to radio unique functionality relating e.g. to the DECT air interface synchronization, DECT protocol conversion allocation of time slot TS on V5.1 , power feeding of radio base stations, concentration of transmission etc. In FIG. 3 the DECT Radio Access Network comprises a number of RFPs connected via 12B+D channels to an AN which is connected to the LE via the V5 , particularly the V5.1 interface structured as explained below. The RFP:s connect to User Ports UPO, $UP_1$, . . . , $UP_n$. The portable parts are not illustrated in this Fig (see FIG. 2) but merely the User Network Interface UNI. According to the invention the address field EFaddr of the V5.1 standard is structured to comprise a first part and a second part denoted RFPaddr and V5 time slot respectively.

The RFPaddr is an address forming part of the EFaddr for identification of each RFP in the DRAN. The value range is between 0–254 which means that up to 255 RFPs can be pointed out or selected. In the EFaddr the values 8176 and above are used for pointing out any of the V5 layer protocols.

Figure 4:
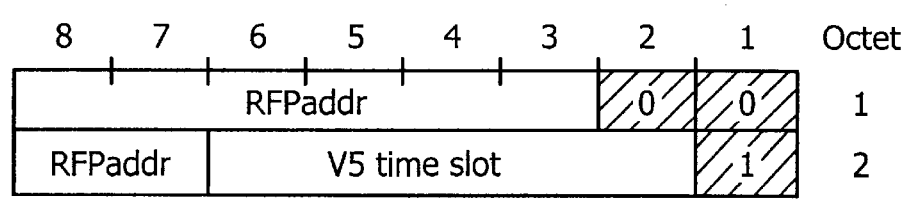
FIG. 4 shows details of the (Efaddr) address field of the V5 interface relating to ISDN signalling according to the invention, FIG. 5 schematically illustrates the architecture of a V5.1 interface from a service point of view as defined according to the standard.

The V5 time slot, i.e. the second part of the address field, is an address forming part of the EFaddr for identification of the selected bearer channel in the V5.1 interface. Any value between 0–31 is possible with the exception of 0 and 16 since these TS:s are reserved for signalling etc. (The V5.1 interface comprises 32 time slots or bearer channels). The address field as structured according to the invention is illustrated in FIG. 4. The shaded figures are reserved for hardware applications and as referred to above the V5 time slot is used for pointing out one of 32 time slots. In FIG. 4 1–8 denote bit 1, . . . , bit 8 and the figures illustrate the frame structure which is supported by the Envelope Function as structured according to the invention. According to the invention concentrated traffic is handled over the V5.1 interface. The difference from the ETSI standard is the user ports handling in that they are not fixed per call at the same time slot in the V5 interface. Since a UP is handled in the DRAN as a RFP, subscriber or user related data does not have to be stored, particularly not permanently, in the DRAN. According to the invention the DRAN is to a considerable extent transparent for user and service signalling.

The DECT Access Interface Function for the CTM services is transparent through the interface which is defined by the signalling between the portable part and the call control part in the LE.

Advantageously the protocol for traffic and mobility handling/management used is an ISDN protocol thus providing ISDN accesses, according to a particular embodiment excluding the PSTN part of V5 protocols as already referred to above.

Advantageously the DECT Radio Application Part is controlled (by itself) within the DRAN.

As already stated above, advantageously an ISDN protocol is chosen for the traffical signalling. Today CTM services are defined as PSTN services but for future services ISDN signalling will be required. However, if the ISDN protocol is used, this is merely a question about where to do the mapping between the different protocols.

The application of the V5.1 interface standard relates to the interpolation of the addressing between the LE and the DRAN. Traditional users (i.e. users not connected via radio) always have a fixed relation between the Directory Number DN and the equipment to the User Network Interface UNI. For the handling of movable users who can be connected anywhere in the network as discussed above, the connection between the user and the used base stations RFP must be flexible. Since advantageously ISDN signalling is used, the EFaddr in the V5 standard is used for identification of the User Port UP in the DRAN which was also discussed in the foregoing. According to the invention the AN (comprised by the RAN or particularly the DRAN) forms the terminal point of the V5.1 interface in the DRAN as far as the CTM Service or application is concerned.

In order to reduce complexity, in an advantageous embodiment, the PSTN part of the V5 protocols is not included. The standard (of the V5 interface) does not require any changes but merely additions.

In FIG. 5 the architecture of the (standardized) V5.1 interface from a service point of view is illustrated. In the figure both ISDN-BA and PSTN accesses are supported (generally the V5.1 interface gives support for leased line services which however not is illustrated) although, the embodiments relating to ISDN-BA accesses are described in a more detailed manner. The Local Line Distribution Network LLDN comprises the AN. The AN comprises a line circuit LC and an exchange terminal ET comprising layers 1–3 L1/2/3 and an LT and an ET comprising layers 1–2 L1/2 and a further LT and an ET layer 1, 2. NT1 indicates Network Termination Type 1 and z,t,t are reference points indicating the extension of the LLDN. The V5 interface comprises Physical Layer PHL, Data Link Layer DLL and Network Layer NWK. The layers are defined in the ETSI standards ETS 300 324-1 and ETS 300 125 (the Data Link Layers). Clause 9 in the V5 standard (ETS 300 324-1) defines Envelope Function Sublayer whereas clause 10 defines the V5 DLL carrying the V5 layer 3 protocols.

Figure 6:
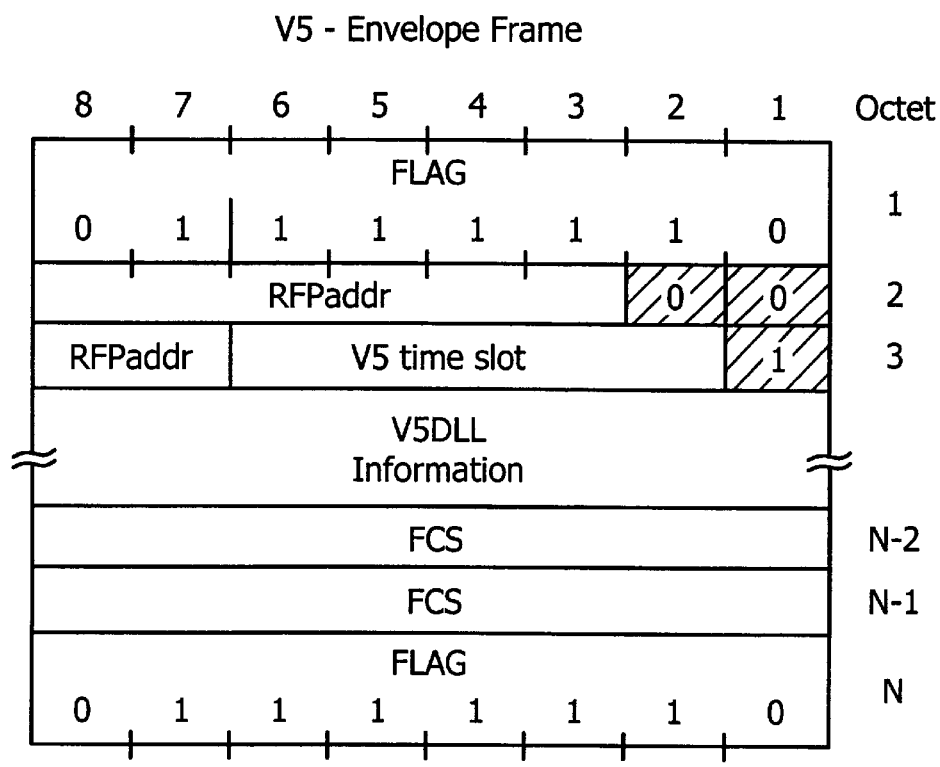
FIG. 6 shows the Data Link Layer for the V5.1 interface as structured according to the invention in a C-channel for ISDN-BA accesses, FIG. 7 corresponds to FIG. 4 but relates to L3addr of a PSTN-network.

FIG. 6 illustrates the DLL for the V5.1 interface in one of the Cchannels. The V5.1 comprises the Envelope Function Address which defines either ISDN User Port, EFaddr=0-8175 or a V5 DLL for any of the layer 3 protocols as defined in the V5 standard. Each layer 3 protocol is carried by a separate V5 DLL addressed with the same value as the EFaddr (EFaddr=8176, . . . ). The ISDN signalling is transparent through the V5 interface and the ISDN DLL is terminated outside the V5 interface function. Moreover the V5 interface function and the ISDN DLLs are transported in the information field of the V5 frame structure as can be seen from FIG. 6. FCS means Frame Check Sum. According to the invention the envelope function address (EFaddr) is modified as discussed under reference to FIG. 4 in that it is divided into the first part RFPaddr and the second part V5 time slot (TS).

The ISDN protocols are defined in ETS 300 102.

Figure 7:
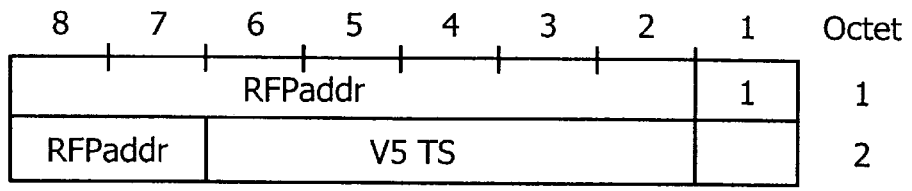

In a particular embodiment of the invention the telecommunications network is a PSTN. The address field L3addr thereof is then structured in principle in the same manner as the EFaddr for the ISDN network. This is illustrated in FIG. 7 which corresponds to FIG. 4 which relates to ISDN. The structure is here substantially the same but the available address field comprises two more bits.

Figure 8:
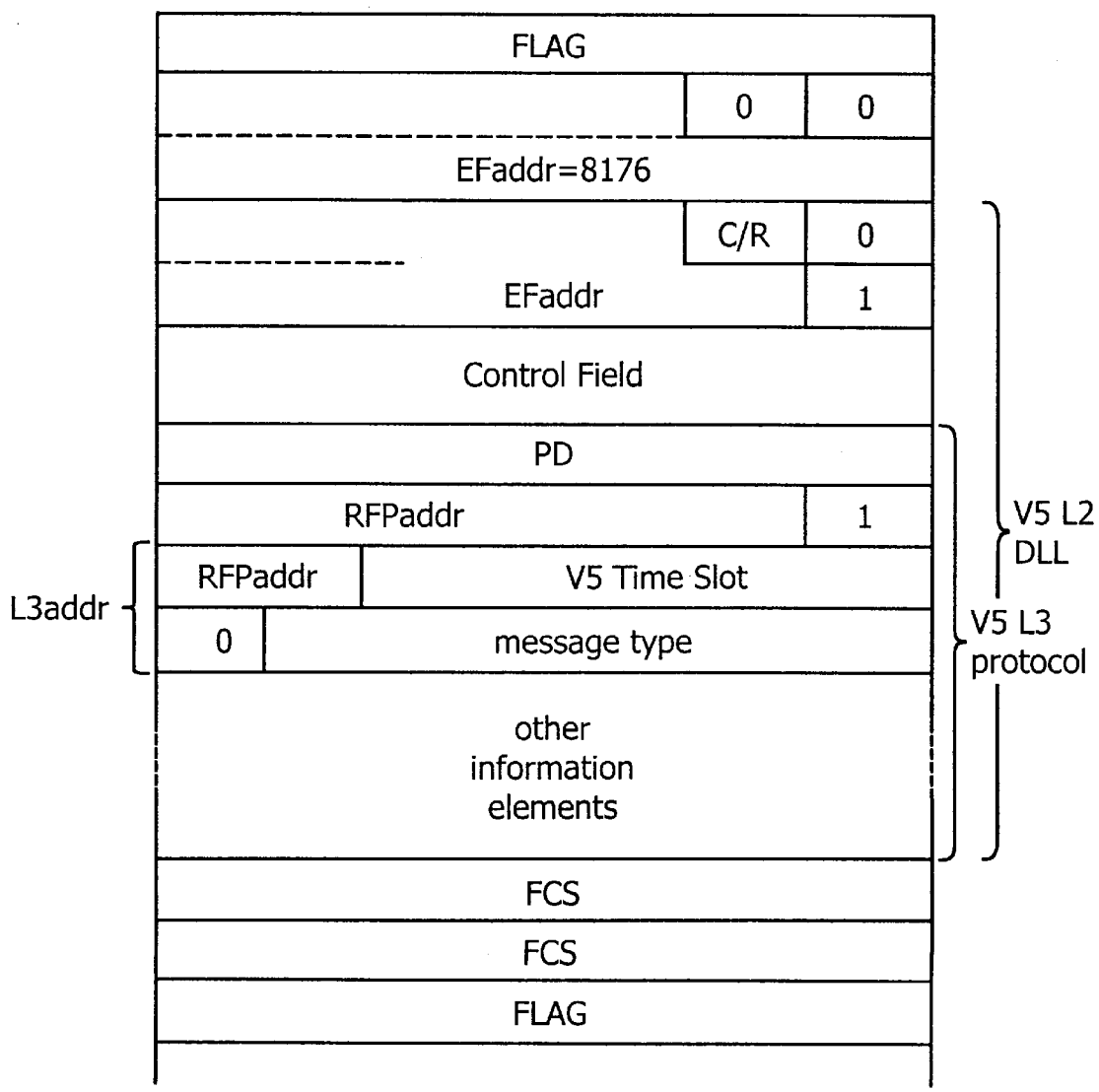
FIG. 8 shows a PSTN protocol with the address field of FIG. 7.

FIG. 8 shows where in the V5 Envelope Frame L3addr is arranged. In FIG. 8 is particularly indicated the structure according to FIG. 7, i.e. L3addr, the V5 layer 3 protocol and the V5 layer 2 (L2) data link layer DLL. The general message formate and information element coding is discussed in ETS 300 324-1. Within the protocol, every message comprises the parts: protocol discriminator (PD), L3address, message type and other information elements, as required. The Protocol-Discriminator PD information element is included within the protocol messages for structural compatibility with other protocols, e.g. with ETS 300102. It provides a mechanism for being future proof, allowing the future use of the same data link connection for other layer 3 protocols e.g. not yet defined. The PD shall be the first element of every message.

The purpose of the L3address is to identify the PSTN user port at the V5.1 interface to which the particular message applies. The L3address is coded in binary and all values from 0–32767 are valid.

Figure 9:
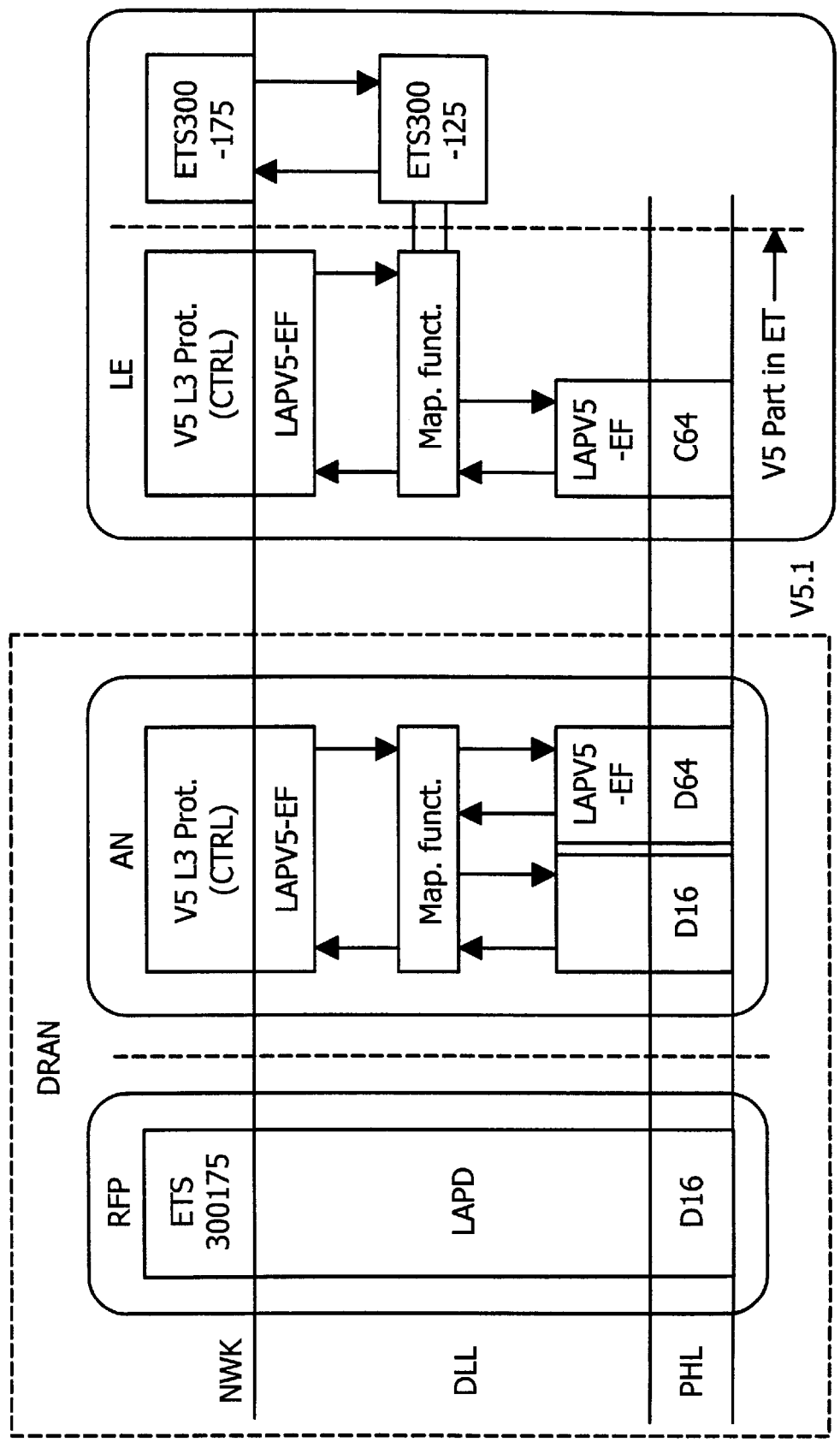
FIG. 9 illustrates a protocol architecture according to the invention.

FIG. 9 is a schematical view of the protocol architecture showing the V5.1 interface interconnecting a local exchange in a DECT Radio Access Network DRAN comprising an AN and an RFP indicating the Network Layer NWK, Data Link Layer DLL and the Physical Layer PHL respectively.

LAPD in the FIG. means the Link Access Protocol D-channel and it is defined in the ETS-standard given in the FIG.. LAPV5-EF of the AN is a Link Access Protocol V5 -Envelope Function and C64 relates to 64 kbit C-channels etc.

One regional processor D-channel signalling RPD of a Local Exchange may control one or more than one DECT Radio Access Network.

An LE needs to know all RFPs as logical addresses in the DRAN (RFPaddr). A number of V5.1 interfaces (up to 73 2048 kbit/s) control the transmission between the LE and the DECT air interface. For signalling one selected bearer channel is used as C-channel (Communication Channel) in anyone of the V5.1 interfaces.

In the following the DECT Radio Access Network DRAN is briefly referred to in order to illustrate one example. Advantageously the radio functionality such as for example handover, synchronisation etc. is within the DECT air interface. Moreover ADPCM is applied which means that all channels to the LE are true 64 kbit/s bearer channels.

Advantageously the selection of channels is done over the V5.1 interface since this provides concentration for terminating and originating calls. In the following an example of the concentration capability in the DRAN will be briefly discussed. For example each RFP may handle 12 bearer channels BC and the coverage area for an RFP may be 25 RFP/km$^2$. As referred to above one DRAN can address up to 255 RFPs thus covering an area of 12 km$^2$. According to this embodiment one DRAN can at most serve 12 (BC)×255 (RFP) giving 3050 traffical channels per DRAN or calls at the same time. If it is assumed that each RFP carries a traffic intensity of 6E (Erlang), this would mean 0.5E per bearer channel in the air interface. One DRAN that carries 0.5× 3060 E per bearer channel would result in 1530 E on each bearer channel. The number of V5.1 interfaces needed for one example of a realistic traffic intensity would be that each V5.1 interface carries 1 E per bearer channel giving 1530/ 30=51 V5.1 interfaces and if each V5.1 carries 0,7 E per bearer channel, this would give 1530/21=73 V5.1 interfaces. If the ADPCM conversion according to another embodiment is moved to the LE side instead, the transmission and number of 2048 kbit/s interfaces would be reduced by 50%.

In the alternative embodiment as briefly discussed earlier in the application, PSTN accesses are provided via the V5.1 interface with additional functionality, or rather allowing the additional application of providing PSTN access. The principles are the same whether PSTN or ISDN is concerned. For PSTN the address field is structured in the same manner as described under reference to ISDN, but the PSTN address field is L3addr. In e.g. a first embodiment the standard is not changed. Then a considerable number of messages between AN and LE over V5 are due. To reduce the number of messages, in an alternate embodiment, new messages are added to the PSTN protocol. Thus the signalling performance can be increased.

It is an advantage of the invention that many subscribers/ users can be accessed/addressed on a limited (low number) of 2048 kbit/s interfaces. Moreover the transmissions within the network can be kept at a low level. Another advantage is that handovers can be handled in AN without generating necessary signalling to the local exchange.

Although the invention has been described under particular reference to the DECT system, it is by no means limited thereto. The DECT Radio Access Network DRAN is merely one particular application of a Radio Access Network. Also in a number of other aspects the invention can be varied, merely limited by the scope of the claims.

What is claimed is:

1. Arrangement for providing access between a number of user stations connected by radio via a number of base stations and a switching arrangement of a telecommunications network, comprising:
   at least one access network which is connected to the switching arrangement over at least one interface,
   a radio access network with a number of base stations connecting to user ports which also comprises said access network, wherein an address field of an addressing mechanism of the interface between the access network and the switching arrangement is structured in such a way that it comprises a first part for addressing base stations and a second part for addressing/ identifying selected bearer channel(s) on the interface (s).

2. Arrangement according to claim 1, wherein the second part of the address field addresses a time slot on the interface.

3. Arrangement according to claim 1, wherein the interface(s) is a V5.1 interface.

4. Arrangement according to claim 3, wherein the address field relates to an envelope function of the V5.1 interface.

5. Arrangement according to claim 4, wherein each base station of the radio access network is identified via the first part of the address field.

6. Arrangement according to claim 5, wherein an envelope function address defines an Integrated Services Digital Network (ISDN) user port.

7. Arrangement according to claim 5, wherein an envelope function address defines a data link layer of the V5.1 interface.

8. Arrangement according to claim 1, wherein the first part of the address field is a layer 3 address and defines Public Switched Telephone Network (PSTN) user ports.

9. Arrangement according to claim 1, wherein the interface or interfaces is/are based on 2048 kbit/s.

10. Arrangement according to claim 1, wherein the interface comprises 32 bearer channels or time slots.

11. Arrangement according to claim 1, wherein the switching arrangement comprises a local exchange.

12. Arrangement according to claim 11, wherein the channels to the local exchange are 64 kbit/s bearer channels.

13. Arrangement according to claim 3, wherein the channels in the V5.1 interface(s) are selected over the V5.1 interface by the radio access network.

14. Arrangement according to claim 1, wherein each radio fixed part handles a number of bearer channels.

15. Arrangement according to claim 1, wherein there is more than one interface between the access network and the switching arrangement.

16. Arrangement according to claim 1, wherein the Radio Access Network is a Digital European Cordless (DECT) Radio Access Network (DRAN) and the users/subscribers are Connected by radio via the DECT air interface.

17. Arrangement according to claim 3, wherein a number of V5.1 interfaces are used for control transmission between the switching arrangement and the interface between the base stations and the user stations.

18. Arrangement according to claim 1, wherein a one bearer channel is used as C-channel for signalling.

19. Arrangement according to claim 3, wherein the network layer of the V5.1 interface comprises a control protocol for coordination of services and operation and maintenance functions between the access network and the switching arrangement.

20. Arrangement according claim 3, wherein the user stations comprise portable parts Providing cordless terminal mobility.

21. Arrangement according to claim 1, wherein Integrated Services Digital Network (ISDN) signalling is used.

22. Arrangement according to claim 1, wherein the switching arrangement is a local exchange of the Integrated Services Digital Network (ISDN).

23. Arrangement according to claim 11, wherein one local exchange controls one Radio Access Network.

24. Arrangement according to claim 11, wherein one local exchange controls more than one Radio Access Network.

25. Telecommunications system comprising a telecommunications network with a number of local exchanges and a radio network comprising a number of user stations connecting to a number of radio base stations via radio, and an extended access network which comprises an access network and radio functionality including the radio base stations, wherein a local exchange(s) interface is connected to the access network via one or more V5.1 interface(s) which are so structured that each radio base station is identified/addressed and the selected bearer channel on the interface is identified.

26. Telecommunications system according to claim 25, wherein the address field of the interface(s) is structured to comprise a first part and a second part for identifying a radio base station and identifying a selected bearer channel, respectively.

27. Telecommunication system according to claim 25, wherein Integrated Services Digital Network (ISDN) signalling is used.

28. Telecommunications system according to claim 25, wherein User Ports are implemented in the extended access network, they are handled as radio base stations, and they are not fixed at the same bearer channel on the interface for the same call.

29. Telecommunications system according to claim 25, wherein at least subscriber data is not stored permanently in the extended access network.

30. A method of providing user equipment with radio access to a switching arrangement of a telecommunications system, wherein at least one access network is connected to the switching arrangement via at least one interface, comprising the steps of:

provining a radio access network which comprises said access network and a number of radio base stations to provide radio functionality, connecting a number of user ports to said radio base stations, structuring an address field of the addressing mechanism of the existing interface(s) so that it comprises a first part and second part, using the first part for addressing of radio base stations, and using the second part for addressing/identifying selected bearer channels on the interface(s).

* * * * *

UNITED STATES PATENT AND TRADEMARK OFFICE
CERTIFICATE OF CORRECTION

PATENT NO.    : 6,278,700 B1
DATED         : August 21, 2001
INVENTOR(S)   : Haster It is certified that error appears in the above-identified patent and that said Letters Patent is hereby corrected as shown below:

Column 10,
Line 42, the word -- Telephone -- after the word "Cordless".

Signed and Sealed this

Twenty-third Day of April, 2002

Attest:

Attesting Officer

JAMES E. ROGAN
Director of the United States Patent and Trademark Office